United States Patent
Adlem et al.

(10) Patent No.: US 8,802,813 B2
(45) Date of Patent: Aug. 12, 2014

(54) POLYMER COMPRISING CYCLOHEXYLENE GROUPS AND ITS USE IN FILMS WITH NEGATIVE OPTICAL DISPERSION

(75) Inventors: Kevin Adlem, Dorset (GB); Owain Llyr Parri, Hampshire (GB); David Wilkes, Southampton (GB); Claire Topping, Southampton (GB)

(73) Assignee: Merck Patent Gesellschaft Mit Beschrankter Haftung, Darmstadt (DE)

( * ) Notice: Subject to any disclaimer, the term of this patent is extended or adjusted under 35 U.S.C. 154(b) by 251 days.

(21) Appl. No.: 13/382,575

(22) PCT Filed: Jun. 17, 2010

(86) PCT No.: PCT/EP2010/003655
§ 371 (c)(1),
(2), (4) Date: Jan. 6, 2012

(87) PCT Pub. No.: WO2011/003505
PCT Pub. Date: Jan. 13, 2011

(65) Prior Publication Data
US 2012/0108781 A1    May 3, 2012

(30) Foreign Application Priority Data

Jul. 9, 2009   (EP) .................................... 09008993

(51) Int. Cl.
*C08G 61/12*    (2006.01)
*C08G 61/00*    (2006.01)

(52) U.S. Cl.
USPC ........... 528/396; 528/220; 528/373; 528/422; 528/425; 528/271

(58) Field of Classification Search
USPC ................ 528/396, 220, 373, 422, 425, 271
See application file for complete search history.

(56) References Cited

U.S. PATENT DOCUMENTS

| 6,203,724 B1 | 3/2001 | Reiffenrath et al. |
| 6,303,194 B1 | 10/2001 | Reiffenrath et al. |
| 6,586,154 B1 | 7/2003 | Choi et al. |
| 2010/0222534 A1 | 9/2010 | Adlem et al. |

FOREIGN PATENT DOCUMENTS

| GB | 2 355 267 A | 4/2001 |
| WO | 2009/039937 A1 | 4/2009 |

OTHER PUBLICATIONS

International Search Report, dated Sep. 27, 2010, issued in corresponding PCT/2010/003655.

*Primary Examiner* — Duc Truong
(74) *Attorney, Agent, or Firm* — Millen, White, Zelano & Branigan, P.C.

(57) ABSTRACT

The invention relates to novel polymers comprising cyclohexylene groups which are especially suitable for use in birefringent films with negative optical dispersion, to novel formulations and polymer films comprising them, and to the use of the polymers, formulations and films in optical, electrooptical, electronic, semiconducting or luminescent components or devices.

13 Claims, 3 Drawing Sheets

POLYMER COMPRISING CYCLOHEXYLENE GROUPS AND ITS USE IN FILMS WITH NEGATIVE OPTICAL DISPERSION

FIELD OF THE INVENTION

The invention relates to novel polymers comprising cyclohexylene groups which are especially suitable for use in birefringent films with negative optical dispersion, to novel formulations and polymer films comprising them, and to the use of the polymers, formulations and films in optical, electrooptical, electronic, semiconducting or luminescent components or devices.

BACKGROUND AND PRIOR ART

There is a need for anisotropic optical films that demonstrate negative optical retardation dispersion. For example, a quarter wave film made with negative dispersion birefringent materials will be largely achromatic. Devices such as reflective LCDs that utilise such a quarter wave film will have a dark state that is not coloured. Currently such devices have to use two retarder films to achieve this effect.

The dispersive power of such a negative dispersion birefringent film can be defined in many ways, however one common way is to measure the optical retardation at 450 nm and divide this by the optical retardation measured at 550 nm ($R_{450}/R_{550}$). If the on-axis retardation of a negative retardation dispersion film at 550 nm is 137.5 nm and the $R_{450}/R_{550}$ value is 0.82, then such a film will be largely a quarter wave film for all wavelengths of visible light and a liquid crystal display device (LCD) using this film as, for example, a circular polarizer would have a substantially black appearance. On the other hand, a film made with an on axis of 137.5 nm which had normal positive dispersion (typically $R_{450}/R_{550}=1.13$) would only be a quarter wave film for one wavelength (550 nm), and an LCD device using this film as, for example, a circular polarizer would have a purple appearance. Another way of representing this information is to plot the change in birefringence as a function of wavelength. FIG. 1 shows a typical birefringence against wavelength plot for a polymerized film made from the commercially available reactive mesogen RM257 (Merck KgaA, Darmstadt, Germany). The $R_{450}/R_{550}$ for this compound is around 1.115.

In an anisotropic optical film formed by rod-shaped, optically anisotropic molecules, the origin of the retardation dispersion is due to the fact that the two refractive indices $n_e$, $n_o$, of the anisotropic molecules (wherein $n_e$ is the "extraordinary refractive index" in the direction parallel to the long molecular axis, and $n_o$ is the "ordinary refractive index" in the directions perpendicular to the long molecular axis) are changing with wavelength at different rates, with $n_e$ changing more rapidly than $n_o$ towards the blue end of the visible wavelength spectrum. One way of preparing material with low or negative retardation dispersion is to design molecules with increased $n_o$ dispersion and decreased $n_e$ dispersion. This is schematically shown in FIG. 2. Such an approach has been demonstrated in prior art to give LC's with negative birefringence and positive dispersion as well as compounds with positive birefringence and negative dispersion.

If the compounds are polymerizable, or are mixed with a polymerizable host material comprising for example polymerizable mesogenic compounds (also known as "reactive mesogens" or "RMs"), it is possible to prepare anisotropic optical polymer films with negative dispersion. This can easily be carried out by in situ polymerization, e.g. by exposure to heat or UV radiation, of the polymerizable material when being uniformly oriented in its mesophase, thereby permanently fixing the macroscopically uniform orientation. Suitable polymerization methods are well-known to the person skilled in the art, and are described in the literature.

Prior art describes the use of coatable materials having negative dispersion for the preparation of optical films. For example, JP 2005-208146 A1 and WO 2006/052001 A1 disclose polymerisable materials largely based on compounds with a "cardo" core group for the preparation of polymer films with negative dispersion.

Prior art also reports that optical films with negative dispersion can be obtained by stretching solvent cast or extruded polymer films. For example, A. Uchiyama and T. Yatabe in Journal of Polymer Science, Part B: Polymer Physics, Vol. 41, 1554-1562 (2003), and Jpn. J. Appl. Phys., 42, 5665-5669 (2003), and WO 00/26705 A1 disclose stretched optical polymer films with negative dispersion. These documents report the use of a "cardo" group to introduce some high refractive index component in a direction orthogonal to the stretched direction of the polymer.

Other documents disclose that the optical properties of stretched polymer films can be controlled by combining polymer components with intrinsically positive and negative birefringence. This optical effect can be achieved either by combining two miscible polymer to make a polymer blend (see for example H. Saito and T. Inoue in Journal of Polymer Science, Part B: Polymer Physics, Vol. 25, 1629-1636 (1987); or K. Kuboyama, T. Kuroda and T. Ougizawa in Macromol. Symp. 249-250, 641-646, (2007)), or by combining two polymer parts or segments; one segment intrinsically positive and the other segment intrinsically negative birefringence into one homopolymer (see for example A. Uchiyama and T. Yatabe in Jpn. J. Appl. Phys. Vol 42, 6941-6945 (2003)).

The terms "intrinsically positive" and "intrinsically negative" birefringence are used to describe the optical properties of polymer films. Examples of stretched polymer films with intrinsically positive birefringence include the following: polycarbonates, polyarylates, polyethylene teraphthalate, polyether sulphone, polyphenylene sulphide, polyphenylene oxide, polyallyl sulphone, polyamide-imides, polyimides, polyolefins, polyvinyl chloride, cellulose. Examples of stretched polymer films with intrinsically negative birefringence include the following: styrene, acrylic ester polymers, methacrylic ester polymers, acrylonitrile polymers.

The intrinsic birefringence is defined as follows:

$$(\Delta n_{int}) = (n_e - n_o)$$

wherein $n_e$ and $n_o$ are the extraordinary and ordinary index of the polymer molecular chain, respectively.

The birefringence of the polymer film depends on two basic factors: firstly the various processes used to prepare the film, like for example casting, annealing and stretching, which determine the state of the polymer backbone, and secondly, the intrinsic birefringence of the polymeric material. The magnitude and sign of the latter depends on the polarisability of functional groups and the arrangement of these groups relative to the main chain. For example, polystyrene has an aliphatic backbone with more polarisable phenyl groups orientated largely orthogonal to it. Similarly, polyacrylonitrile has an aliphatic backbone and highly polarisable nitrile group oriented largely orthogonal to the backbone. Both the later polymers demonstrate negative intrinsic birefringence. In other words, the sign of the intrinsic birefringence is determined by the orientation of the chromophore relative to the aligned polymer backbone. For intrinsically negative birefringent polymers, the transition moment of the polarisable groups or chromophores should be oriented away from the polymer backbone. This is further discussed in WO 2007/075264 A1.

Methods of measuring the birefringence of a cast polymer film are described by J. S. Machell, J. Greener, and B. A. Contestable in Macromolecules, Vol. 23, No. 1, (1990).

However, many of the materials disclosed in the literature have drawbacks, like for example, the difference between the polarisability of the groups orientated parallel and perpendicular to the stretch axis of the polymer is not sufficiently large, so the polymeric material has to contain a relatively high concentration of units that lower the birefringence dispersion, which are normally the expensive component of the total pre-polymer mixture.

Therefore, there is a still a need for materials that are suitable for the preparation of polymer films with negative optical dispersion, which are easy to synthesize and available at reduced cost, have good proccessability and have improved properties such as solubility and thermal properties.

It is therefore an aim of the present invention to provide novel and improved materials for use in polymer films with negative optical dispersion, which show the above-mentioned advantageous properties and do not have the drawbacks of the prior art materials. Another aim of the invention is to extend the pool of materials and polymer films having negative dispersion that are available to the expert. Other aims are immediately evident to the expert from the following description.

It has been found that these aims can be achieved by providing compounds, materials and films as claimed in the present invention.

In particular, it was found that this can be achieved by using axially substituted cyclohexane diols to prepare efficient segments in copolymers that can be processed into optical films showing negative dispersion.

To achieve negative birefringence dispersion in a stretched polymer film, the wavelength dispersion of the ordinary refractive index should be greater than the wavelength dispersion of the extraordinary refractive index. Intrinsically negative birefringent polymers or segment of polymers enable the wavelength dispersion of the ordinary refractive indices of the polymer to increase. Therefore, a polymer film that demonstrates negative birefringence dispersion should be composed of a suitable molecular ratio of intrinsically negative and intrinsically positive birefringent segments. It is advantageous to minimise the amount of intrinsically negative birefringent segments in the polymer because it decreases the birefringence of the stretched film. It is reasonable to assume that to maximise the "efficiency" of the polymer segment that contributes to lowering the dispersion of the film, a segment should possess highly polarisable groups and that the polarisable groups should be oriented largely orthogonal to the main chain, and furthermore, its orientation should be constrained so that it remained in this preferred orientation.

SUMMARY OF THE INVENTION

The invention relates to compounds of formula I

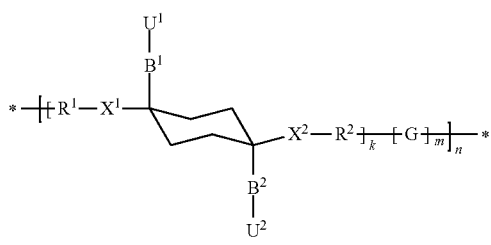

wherein k is, in each occurrence independently of one another, 0 or 1, with k in at least one repeating unit being 1, m is, in each occurrence independently of one another, 0 or 1, n is an integer >1, $R^1$, $R^2$ are independently of each other straight-chain, branched or cyclic alkylene with 1 to 20, preferably 1 to 12 C-atoms, which is unsubstituted, mono- or polysubstituted by F, Cl, Br, I or CN, and wherein one or more non-adjacent $CH_2$ groups are optionally replaced, in each case independently from one another, by —O—, —S—, —NH—, —$NR^0$—, —$SiR^0R^{00}$—, —CO—, —CO—O—, —O—CO—, —O—CO—O—, —S—CO—, —CO—S—, —$SO_2$—, —CO—$NR^0$—, —$NR^0$—CO—, —$NR^0$—CO—$NR^{00}$—, —$CY^1$=$CY^2$— or —C≡C— in such a manner that O and/or S atoms are not linked directly to one another, or a single bond, $Y^1$, $Y^2$ are independently of each other H, F, Cl, CN or $R^0$, $R^0$, $R^{00}$ are independently of each other H or alkyl with 1 to 12 C-atoms, $X^1$, $X^2$ are independently of each other a linkage group, preferably selected from the group consisting of —O—, —S—, —CO—, —CO—O—, —O—CO—, —O—CO—O—, —CO—$NR^0$—, —$NR^0$—CO—, —$NR^0$—CO—$NR^0$—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$(CH_2)_{n1}$—, —$(CF_2)_{n1}$—, —$CF_2CH_2$—, —$CH_2CF_2$—, —$CF_2CF_2$—, —CH=CH—, —$CY^1$=$CY^2$—, —CH=N—, —N=CH—, —N=N—, —CH=$CR^0$—, —C≡C—, —CH=CH—CO—O—, —O—CO—CH=CH—, —$CR^0R^{00}$— and a single bond, n1 is 1, 2, 3, 4, 5 or 6, $B^1$, $B^2$ are independently of each other a bivalent group having high polarisability, preferably selected from the group consisting of —C≡C—, —$CY^1$=$CY^2$—, optionally substituted aromatic or heteroaromatic groups, and combinations of the aforementioned, $U^1$, $U^2$ are independently of each other, H or a monovalent group of formula II, wherein the asterisk denotes the linkage to the adjacent group $B^1$ or $B^2$, respectively

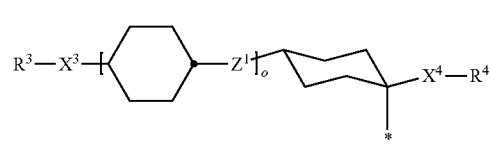

$R^3$, $R^4$ are independently of each other straight-chain, branched or cyclic alkyl with 1 to 20, preferably 1 to 12 C-atoms, which is unsubstituted, mono- or polysubstituted by F, Cl, Br, I or CN, and wherein one or more non-adjacent $CH_2$ groups are optionally replaced, in each case independently from one another, by —O—, —S—, —NH—, —$NR^0$—, —$SiR^0R^{00}$—, —CO—, —CO—O—, —O—CO—, —O—CO—O—, —S—CO—, —CO—S—, —$SO_2$—, —CO—$NR^0$—, —$NR^0$—CO—, —$NR^0$—CO—$NR^{00}$—, —$CY^1$=$CY^2$— or —C≡C— in such a manner that O and/or S atoms are not linked directly to one another, or a single bond, $X^3$, $X^4$ independently of each other have one of the meanings of $X^1$, $Z^1$ has in each occurrence independently of one another one of the meanings of $X^1$, o is 0, 1, 2, 3, 4 or 5, G has one of the meanings of $R^1$ or is a bivalent group of formula III $$—X^5-A^1-(Z^2-A^2)_p-X^6—\qquad III$$

$X^5$, $X^6$ independently of each other have one of the meanings of $X^1$, $A^1$, $A^2$ are independently of each other a carbocyclic, heterocyclic, aromatic or heteroaromatic group, which is optionally substituted, $Z^2$ has in each occurrence independently of one another one of the meanings of $X^1$, and p is 0, 1, 2 or 3, The invention further relates to a formulation comprising one or more compounds as described above and below.

The invention further relates to a birefringent polymer film obtainable from compound or formulation as described above and below.

The invention further relates to a birefringent polymer film with $R_{450}/R_{550}<1$, wherein $R_{450}$ is the optical on-axis retardation at a wavelength of 450 nm and $R_{550}$ is the optical on-axis retardation at a wavelength of 550 nm, said film being obtainable from a compound or formulations as described above and below.

The invention further relates to the use of compounds, formulations and polymer films as described above and below in optical, electronic and electrooptical components and devices, preferably in optical films, retarders or compensators having negative optical dispersion.

The invention further relates to an optical, electronic or electrooptical component or device, comprising a compound, formulation or polymer film as described above and below.

Said devices and components include, without limitation, electrooptical displays, LCDs, optical films, polarizers, compensators, beam splitters, reflective films, alignment layers, colour filters, holographic elements, hot stamping foils, coloured images, decorative or security markings, LC pigments, adhesives, non-linear optic (NLO) devices, optical information storage devices, electronic devices, organic semiconductors, organic field effect transistors (OFET), integrated circuits (IC), thin film transistors (TFT), Radio Frequency Identification (RFID) tags, organic light emitting diodes (OLED), organic light emitting transistors (OLET), electroluminescent displays, organic photovoltaic (OPV) devices, organic solar cells (O-SC), organic laser diodes (O-laser), organic integrated circuits (O-IC), lighting devices, sensor devices, electrode materials, photoconductors, photodetectors, electrophotographic recording devices, capacitors, charge injection layers, Schottky diodes, planarising layers, antistatic films, conducting substrates, conducting patterns, photoconductors, electrophotographic applications, electrophotographic recording, organic memory devices, biosensors, biochips, optoelectronic devices requiring similar phase shift at multiple wavelengths, combined CD/DVD/HD-DVD/Blu-Rays, reading, writing re-writing data storage systems, or cameras.

DEFINITIONS OF TERMS

Figure 1:
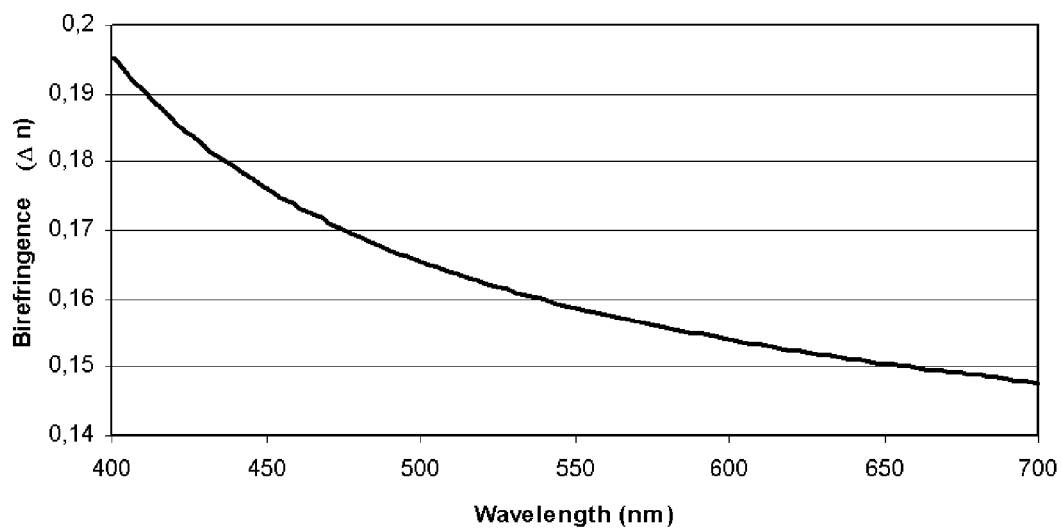
FIG. 1 shows the birefringence versus wavelength plot for a polymerized film made from a reactive mesogen of prior art.
Figure 2:
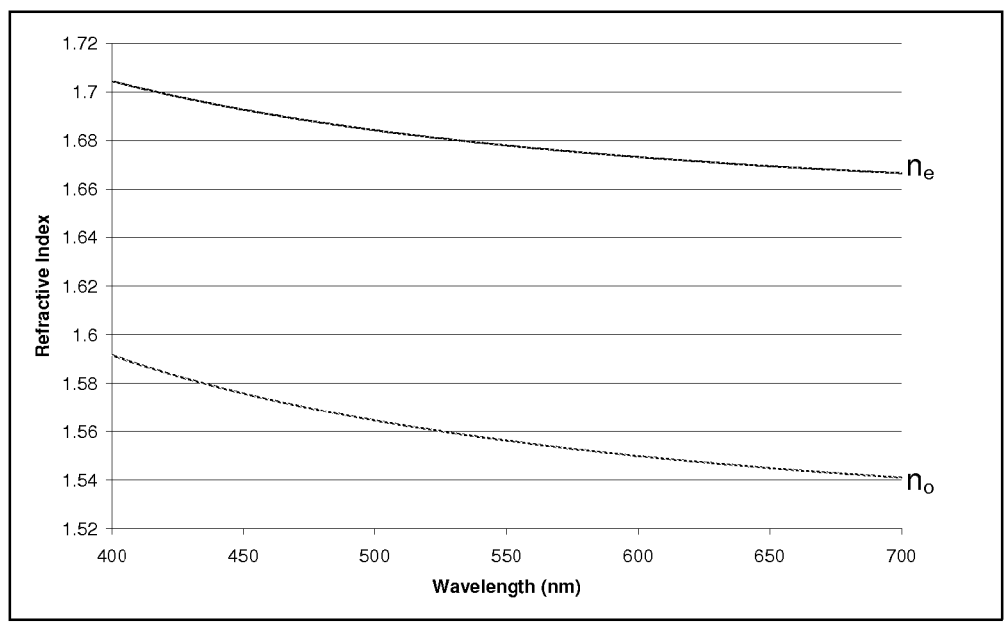
FIG. 2 shows the refractive index versus wavelength plot of a modeled molecule with low or negative retardation dispersion, showing increased $n_o$ dispersion and decreased $n_e$ dispersion.

The term "film" includes rigid or flexible, self-supporting or free-standing films with mechanical stability, as well as coatings or layers on a supporting substrate or between two substrates.

The term "polymer" means a molecule of high relative molecular mass, the structure of which essentially comprises the multiple repetition of units derived, actually or conceptually, from molecules of low relative molecular mass. The terms "unit", "repeating unit" and "monomeric unit" mean the constitutional repeating unit (CRU), which is the smallest constitutional unit the repetition of which constitutes the polymer (see PAC 1996, 68, 2291).

The term "conjugated" means a compound containing mainly C atoms with $sp^2$-hybridisation (or optionally also sp-hybridisation), which may also be replaced by hetero atoms. In the simplest case this is for example a compound with alternating C—C single and double (or triple) bonds, but does also include compounds with units like 1,3-phenylene. "Mainly" means in this connection that a compound with naturally (spontaneously) occurring defects, which may lead to interruption of the conjugation, is still regarded as a conjugated compound.

Unless stated otherwise, the molecular weight is given as the number average molecular weight $M_n$ or weight average molecular weight $M_w$, which is determined by gel permeation chromatography (GPC) against polystyrene standards. The degree of polymerization (n) means the number average degree of polymerization, given as $n=M_n/M_u$, wherein $M_u$ is the molecular weight of the single repeating unit.

On the molecular level, the birefringence of a liquid crystal depends on the anisotropy of the polarizability ($\Delta\alpha=\alpha_\parallel-\alpha\perp$). "Polarizability" means the ease with which the electron distribution in the atom or molecule can be distorted. The polarizability increases with greater number of electrons and a more diffuse electron cloud. The polarizability can be calculated using a method described in eg Jap. J. Appl. Phys. 42, (2003) p 3463.

The "optical retardation" at a given wavelength $R(\lambda)$ (in nm) of a layer of liquid crystalline or birefringent material is defined as the product of birefringence at that wavelength $\Delta n(\lambda)$ and layer thickness d (in nm) according to the equation $$R(\lambda)=\Delta n(\lambda)\cdot d$$

The optical retardation R represents the difference in the optical path lengths in nanometres travelled by S-polarised and P-polarised light whilst passing through the birefringent material. "On-axis" retardation means the retardation at normal incidence to the sample surface.

The term "negative (optical) dispersion" refers to a birefringent or liquid crystalline material or layer that displays reverse birefringence dispersion where the magnitude of the birefringence ($\Delta n$) increases with increasing wavelength ($\lambda$). i.e $|\Delta n(450)|<|\Delta n(550)|$, or $\Delta n(450)/\Delta n(550)<1$, where $\Delta n(450)$ and $\Delta n(550)$ are the birefringence of the material measured at wavelengths of 450 nm and 550 nm respectively. In contrast, "positive (optical) dispersion" means a material or layer having $|\Delta n(450)|>|\Delta n(550)|$ or $\Delta n(450)/\Delta n(550)>1$. See also for example A. Uchiyama, T. Yatabe "Control of Wavelength Dispersion of Birefringence for Oriented Copolycarbonate Films Containing Positive and Negative Birefringent Units". J. Appl. Phys. Vol. 42 pp 6941-6945 (2003).

Figure 3A:
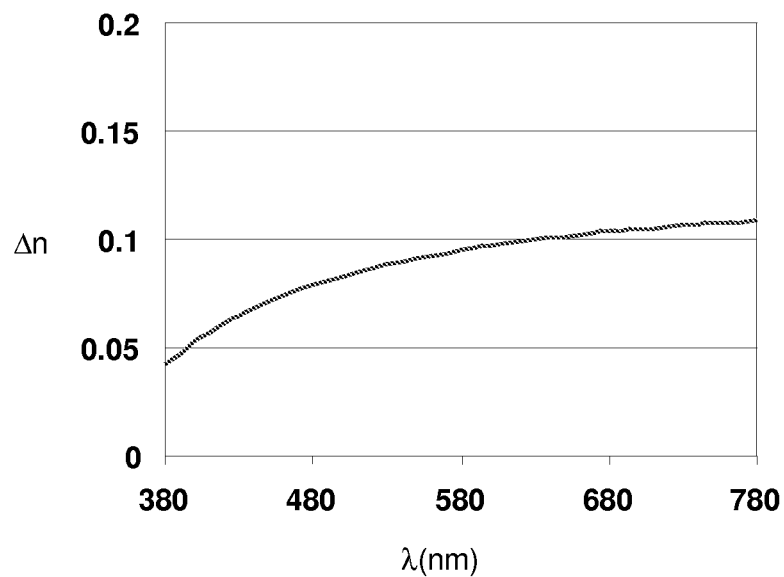
FIG. 3a and FIG. 3b show the birefringence versus wavelength plot for a compound with negative optical dispersion (3a) and positive optical dispersion (3b), respectively.
Figure 3B:
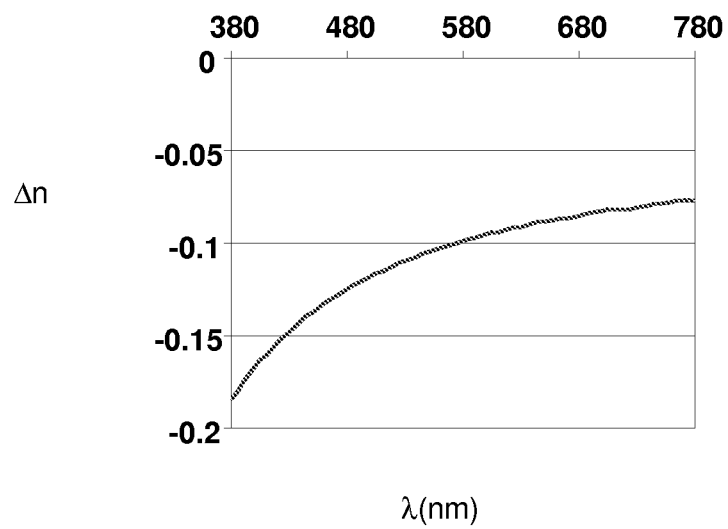

This is shown in its birefringence versus wavelength plot as exemplarily depicted in FIG. 3a. In contrast, the birefringence versus wavelength plot of a typical compound with positive optical dispersion is depicted in FIG. 3b.

Since the optical retardation at a given wavelength is defined as the product of birefringence and layer thickness as described above [$R(\lambda)=\Delta n(\lambda)\cdot d$], the optical dispersion can be expressed either as the "birefringence dispersion" by the ratio $\Delta n(450)/\Delta n(550)$, or as "retardation dispersion" by the ratio $R(450)/R(550)$, wherein $R(450)$ and $R(550)$ are the retardation of the material measured at wavelengths of 450 nm and 550 nm respectively. Since the layer thickness d does not change with the wavelength, $R(450)/R(550)$ is equal to $\Delta n(450)/\Delta n(550)$. Thus, a material or layer with negative or reverse dispersion has $R(450)/R(550)<1$ or $|R(450)|<|R(550)|$, and a material or layer with positive or normal dispersion has $R(450)/R(550)>1$ or $|R(450)|>|R(550)|$.

In the present invention, unless stated otherwise "optical dispersion" means the retardation dispersion i.e. the ratio $(R(450)/R(550)$.

The retardation ($R(\lambda)$) of a material can be measured using a spectroscopic ellipsometer, for example the M2000 spectroscopic ellipsometer manufactured by J. A. Woollam Co., This instrument is capable of measuring the optical retardance in nanometres of a birefringent sample e.g. Quartz over a range of wavelengths typically, 370 nm to 2000 nm. From this data it is possible to calculate the dispersion ($R(450)/R(550)$ or $\Delta n(450)/\Delta n(550)$) of a material.

A method for carrying out these measurements was presented at the National Physics Laboratory (London, UK) by N. Singh in October 2006 and entitled "Spectroscopic Ellipsometry, Part 1—Theory and Fundamentals, Part 2—Practical Examples and Part 3—measurements". In accordance with the measurement procedures described Retardation Measurement (RetMeas) Manual (2002) and Guide to WVASE (2002) (Woollam Variable Angle Spectroscopic Ellipsometer) published by J. A. Woollam Co. Inc (Lincoln, Nebr., USA). Unless stated otherwise, this method is used to determine the retardation of the materials, films and devices described in this invention.

DETAILED DESCRIPTION OF THE INVENTION

The prior art documents cited above demonstrate the general feasibility of making negative dispersion films using polymers with negative intrinsic birefringence. However, there is still a need to increase the effect that the intrinsically negative birefringence inducing units have on the overall optical property of the optical film. This is to minimise the concentration of these more expensive units in the prepolymer mixture, so as to both reduce cost and to minimise any possible detrimental effect such groups might have on the physical properties of the polymer film.

In the present invention it was now found that axially substituted cyclohexane units or variants of such units can be used as segments in a copolymer that can be processed to give a negative dispersion optical film. The units of the copolymer that make a contribution to negative dispersion should have intrinsically negative birefringence. It is advantageous to design these units so that they make the maximum contribution to the increasing the wavelength dispersion of the ordinary refractive index of the stretched copolymer. Another significant design criteria is that the angle which the highly dispersive part of the unit makes with the polymer main chain should be substantially orthogonal. Another important design criteria is that the dispersive power of the group oriented lateral to the main chain should be high. This can be achieved by increasing the polarisability of such a group. The axially substituted cyclohexane units in formula I fulfill these two criteria.

Figure 4:
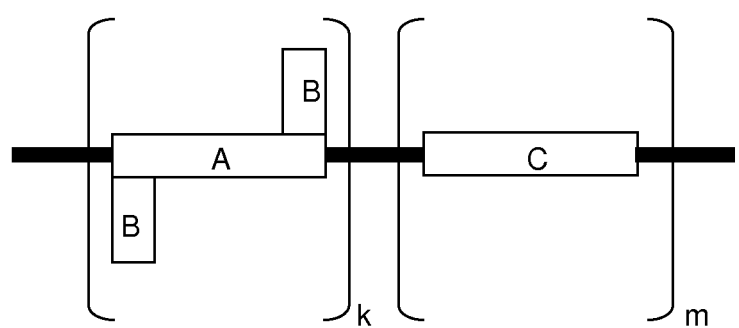
FIG. 4 exemplarily and schematically illustrates the structure of a polymer according to the present invention.

The above criteria were realised by providing (co)polymers of formula I according to the present invention. These (co)polymers do mainly consist of two distinct molecular parts as exemplarily and schematically shown in FIG. 4: A first monomeric unit with a segment A (cyclohexane ring in formula I) having low birefringence in the polymer main chain, and one or more groups B (the group $B^{1,2}$ in formula I) with high birefringence in lateral direction. The comonomeric units C (group G in formula I) do not significantly contribute to the negative dispersion.

In the case of the cyclohexane axially substituted with a highly polarisable group, like for example a phenyl acetylene group, the orientation of the polarisable phenyl acetylene group is determined by the tetrahedral arrangement around an $sp^3$ hybridized carbon atom. The synthesis and stereochemistry of trans-1,4-diethynyl-1,4-diol has been confirmed by X-ray and has been disclosed in C. E. Wagner and K J. Shea in Organic Letters Vol. 6, No. 3, 313-316, (2004) showing orientation of the acetylene groups relative to the cyclohexane ring in the chair configuration. However, the inventive concept is not limited to laterally disubstituted cyclohexane units. The same arguments about the orientation of the polarisable group relative to the cyclohexane are also valid for monosubstituted cyclohexane units.

In formula I the groups $B^{1,2}$ having high polarizability do preferably consist mainly, very preferably exclusively, of one or more subgroups $B_i$, which are selected from pi-conjugated linear groups, aromatic and heteroaromatic groups.

Preferably the groups $B^{1,2}$ consist, very preferably exclusively, of one or more subgroups $B_i$ selected from groups having a bonding angle of 120° or more, preferably in the range of 180°. Suitable and preferred subgroups $B_i$ include, without limitation, groups comprising sp-hybridised C-atoms, like —C≡C—, or divalent aromatic groups connected to their neighboured groups in para-position, like e.g. 1,4-phenylene, naphthalene-2,6-diyl, indane-2,6-diyl or thieno[3,2-b]thiophene-2,5-diyl. Further possible subgroups $B_i$ include —CH═CH—, —CY$^1$═CY$^2$—, and —CH═CR$^0$— wherein Y$^1$, Y$^2$, R$^0$ have the meanings given above.

The groups $B^{1,2}$ do preferably consist essentially of subgroups $B_i$ with pi-conjugation and have a high polarizability and a high refractive index. Since the cyclohxylene ring in the polymer main chain has a low polarizability and a low refractive index, as a result the polymer of formula I shows negative retardation dispersion.

Preferably the groups $B^{1,2}$ in formula I comprise one or more groups selected from the group consisting of optionally substituted 1,4-phenylene and optionally substituted 9H-fluorene-2,7-diyl. The subgroups $B_i$ are preferably selected from the group consisting of —C≡C— optionally substituted 1,4-phenylene and optionally substituted 9H-fluorene-2,7-diyl, wherein in the fluorene group the H-atom in 9-position is optionally replaced by a carbyl or hydrocarbyl group.

Very preferably the groups $B^{1,2}$ in formula I are selected from the group consisting of —C≡C—, —C≡C—C≡C—, —C≡C—C≡C—C≡C—, —C≡C—C≡C—C≡C—C≡C—,

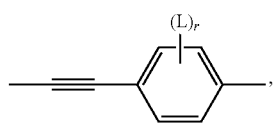

-continued

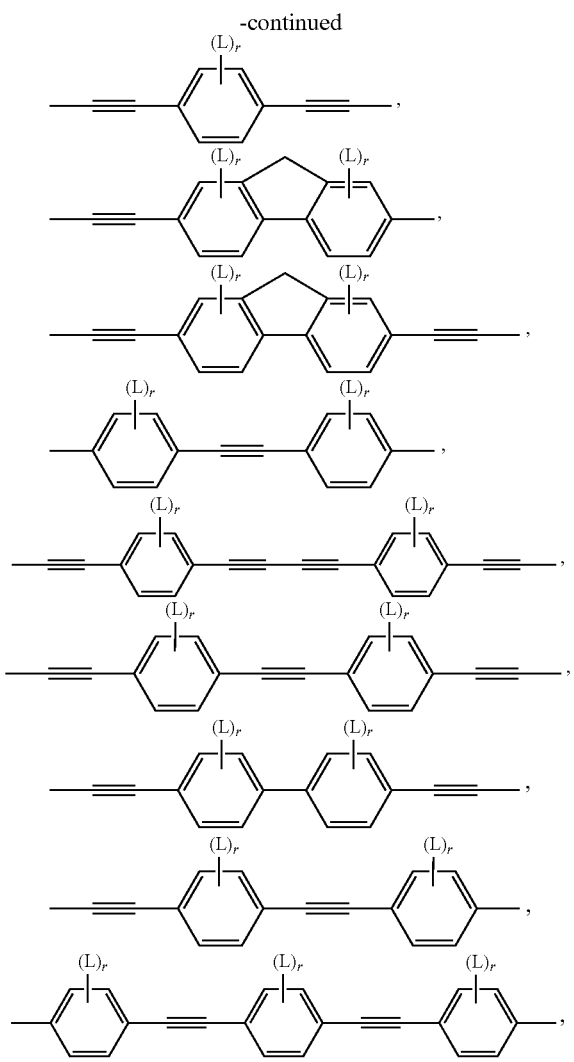

wherein r is 0, 1, 2, 3 or 4 and L has the meaning as described below.

$X^1$ and $X^2$ in formula I are preferably —O—, —CO—, —CO—O—, —O—CO— or —O—CO—O—.

$R^1$ and $R^2$ in formula I are preferably a single bond. If $R^1$ and/or $R^2$ do not denote a single bond, they do preferably denote alkylene with 1 to 20 C atoms, preferably 1 to 15 C-atoms, which is optionally mono- or polysubstituted by F, Cl, Br, I or CN, and wherein one or more non-adjacent $CH_2$ groups are optionally replaced, in each case independently from one another, by —O—, —S—, —NH—, —NR$^0$—, —SiR$^0$R$^{00}$—, —CO—, —COO—, —OCO—, —O—CO—O—, —S—CO—, —CO—S—, —NR$^0$—CO—O—, —O—CO—NR$^0$—, —NR$^0$—CO—NR$^0$—, —CH═CH— or —C≡C— in such a manner that O and/or S atoms are not linked directly to one another.

Preferred groups $R^{1,2}$ are, for example, —(CH$_2$)$_{p1}$—, —(CH$_2$CH$_2$O)$_{q1}$—CH$_2$CH$_2$—, —CH$_2$CH$_2$—S—CH$_2$CH$_2$— or —CH$_2$CH$_2$—NH—CH$_2$CH$_2$— or (SiR$^0$R$^{00}$—O)$_{p1}$—, with p1 being an integer from 2 to 12, q1 being an integer from 1 to 3 and R$^0$ and R$^{00}$ having the meanings given above. Very preferred groups $R^{1,2}$ are ethylene, propylene, butylene, pentylene, hexylene, heptylene, octylene, nonylene, decylene, undecylene, dodecylene, tridecylene, tetradecylene, pentadecylene, ethyleneoxyethylene, methyleneoxy-butylene, ethylene-thioethylene, ethylene-N-methyl-iminoethylene, 1-methylalkylene, ethenylene, propenylene and butenylene for example.

In formula II, $Z^1$ is preferably a single bond. The index o is preferably 0, 1 or 2. $X^3$ and $X^4$ are preferably —O—, —CO—, —CO—O—, —O—CO— or —O—CO—O—. $R^3$ and $R^4$ are preferably alkyl or alkenyl with 1 to 12 C atoms.

Especially preferably the groups $U^1$, $U^2$ are, independently of each other, H, or are selected from the group consisting of the following subformulae

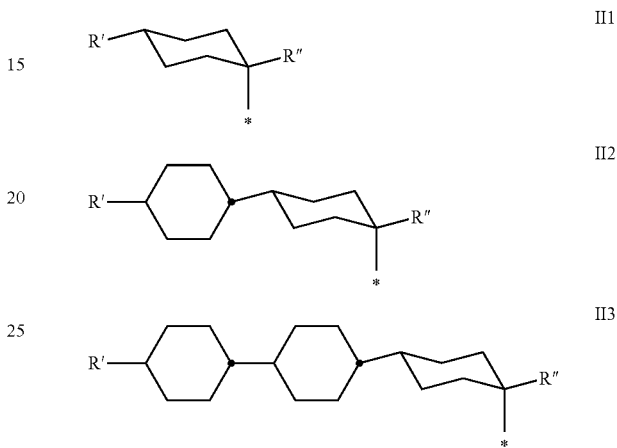

wherein R' and R" are alkyl or alkenyl with 1 to 12 C atoms, X' and X" are independently of each other —O—, —CO—O—, —O—CO— or a single bond, and the asterisk denotes the linkage to the adjacent group $B^1$ or $B^2$, respectively.

In the group G of formula III the aromatic and heteroaromatic groups $A^{1,2}$ may be mononuclear, i.e. having only one aromatic ring (like for example phenyl or phenylene), or polynuclear, i.e. having two or more fused rings (like for example napthyl or naphthylene). Especially preferred are mono-, bi- or tricyclic aromatic or heteroaromatic groups with up to 25 C atoms that may also comprise fused rings and are optionally substituted.

Preferred aromatic groups $A^{1,2}$ include, without limitation, benzene, biphenylene, triphenylene, [1,1':3',1"]terphenyl-2'-ylene, naphthalene, anthracene, binaphthylene, phenanthrene, pyrene, dihydropyrene, chrysene, perylene, tetracene, pentacene, benzpyrene, fluorene, indene, indenofluorene, spirobifluorene, etc.

Preferred heteroaromatic groups $A^{1,2}$ include, without limitation, 5-membered rings like pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings like pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, and fused systems like carbazole, indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, dithienopyridine, isobenzothiophene, dibenzothiophene, benzothiadiazothiophene, or combinations thereof.

The non-aromatic carbocyclic and heterocyclic groups, like $A^{1-4}$, include those which are saturated (also referred to as "fully saturated"), i.e. they do only contain C-atoms or hetero atoms connected by single bonds, and those which are unsaturated (also referred to as "partially saturated"), i.e. they also comprise C-atoms or hetero atoms connected by double bonds. The non-aromatic rings may also comprise one or more hetero atoms, preferably selected from Si, O, N and S.

The non-aromatic carbocyclic and heterocyclic groups $A^{1,2}$ may be mononuclear, i.e. having only one ring (like for example cyclohexane), or polynuclear, i.e. having two or more fused rings (like for example decahydronaphthalene or bicyclooctane). Especially preferred are fully saturated groups. Further preferred are mono-, bi- or tricyclic non-aromatic groups with up to 25 C atoms that optionally comprise fused rings and are optionally substituted. Very preferred are 5-, 6-, 7- or 8-membered carbocyclic rings wherein one or more C-atoms are optionally replaced by Si and/or one or more CH groups are optionally replaced by N and/or one or more non-adjacent CH$_2$ groups are optionally replaced by —O— and/or —S—, all of which are optionally substituted.

Preferred non-aromatic rings $A^{1,2}$ include, without limitation, 5-membered rings like cyclopentane, tetrahydrofuran, tetrahydrothiofuran, pyrrolidine, 6-membered rings like cyclohexane, silinane, cyclohexene, tetrahydropyran, tetrahydrothiopyran, 1,3-dioxane, 1,3-dithiane, piperidine, 7-membered rings like cycloheptane, and fused systems like tetrahydronaphthalene, decahydronaphthalene, indane, bicyclo[1.1.1]pentane-1,3-diyl, bicyclo[2.2.2]octane-1,4-diyl, spiro[3.3]heptane-2,6-diyl, octahydro-4,7-methano-indan-2,5-diyl, or combinations thereof.

Especially preferred groups $A^1$ and $A^2$ are selected from 1,4-phenylene, wherein optionally 1, 2 or 3 CH groups are replaced by N, or cyclohexylene-1,4-diyl, wherein optionally 1 or 2 non-adjacent CH$_2$ groups are replaced by O and/or S, wherein all these rings are unsubstituted or substituted by 1, 2, 3 or 4 groups L.

In formula III, $Z^2$ is preferably selected from —CH$_2$CH$_2$—, —CR$^0$R$^{00}$— and a single bond. The index p is preferably 0, 1 or 2, most preferably 0 or 1. $X^5$ and $X^6$ are preferably —O—, —CO—, —CO—O—, —O—CO— or a single bond.

Especially preferred bivalent groups G are selected from the group consisting of the following subformulae, which are connected to adjacent groups via the terminal O-atoms:

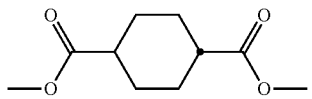

III1

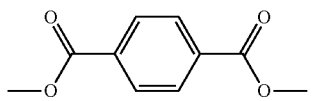

III2

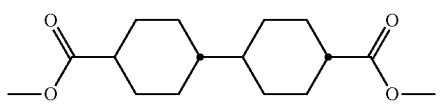

III3

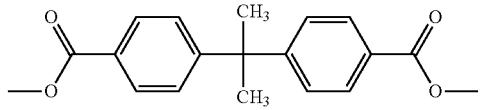

III4

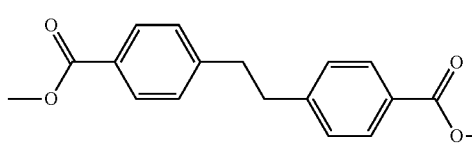

III5

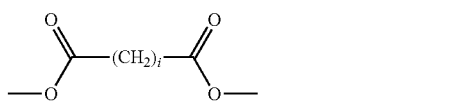

III6

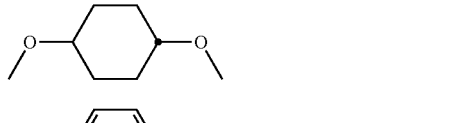

III7

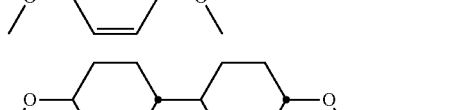

III8

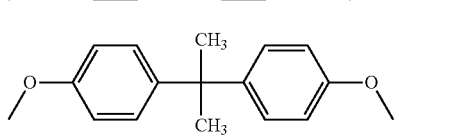

III9

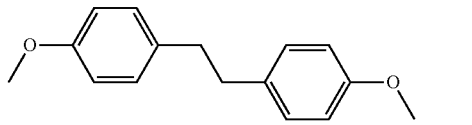

III10

III11

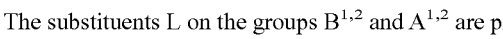

III12 wherein i is an integer from 1 to 12, preferably from 4 to 8.

The substituents L on the groups $B^{1,2}$ and $A^{1,2}$ are preferably selected from F, Cl, Br, I, —CN, —NO$_2$, —NCO, —NCS, —OCN, —SCN, —C(=O)NR$^0$R$^{00}$, —C(=O)X, —C(=O)OR$^0$, —C(=O)R$^0$, —NR$^0$R$^{00}$, —OH, —SF$_5$, optionally substituted silyl, aryl or heteroaryl with 1 to 12, preferably 1 to 6 C atoms, and straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, wherein R$^0$ and R$^{00}$ are as defined in formula I and X is halogen.

Preferred substituents L are selected from F, Cl, CN, NO$_2$ or straight chain or branched alkyl, alkoxy, alkylcarbonyl, alkoxycarbonyl, alkylcarbonyloxy or alkoxycarbonyloxy with 1 to 12 C atoms, wherein the alkyl groups are optionally perfluorinated, or P-Sp-, wherein P is a polymerisable group and Sp is a spacer group or a single bond.

Very preferred substituents L are selected from F, Cl, CN, NO$_2$, CH$_3$, C$_2$H$_5$, C(CH$_3$)$_3$, CH(CH$_3$)$_2$, CH$_2$CH(CH$_3$)C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$ or P-Sp-, in particular F, Cl, CN, CH$_3$, C$_2$H$_5$, C(CH$_3$)$_3$, CH(CH$_3$)$_2$, OCH$_3$, COCH$_3$ or OCF$_3$, most preferably F, Cl, CH$_3$, C(CH$_3$)$_3$, OCH$_3$ or COCH$_3$, or P-Sp-.

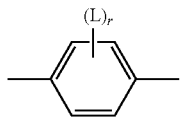

is preferably

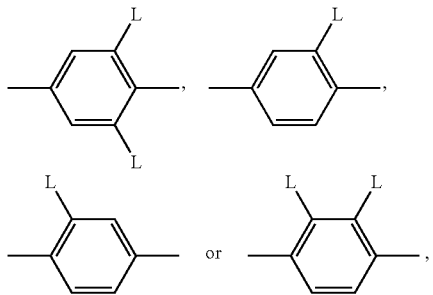

with L having each independently one of the meanings given above.

The groups R$^{3,4}$ are preferably selected from straight-chain, branched or cyclic alkyl with 1 to 40, preferably 1 to 25 C-atoms, which is unsubstituted, mono- or polysubstituted by F, Cl, Br, I or CN, and wherein one or more non-adjacent CH$_2$ groups are optionally replaced, in each case independently from one another, by —O—, —S—, —NH—, —NR$^0$—, —SiR$^0$R$^{00}$—, —CO—, —COO—, —OCO—, —O—CO—O—, —S—CO—, —CO—S—, —SO$_2$—, —CO—NR$^0$—, —NR$^0$—CO—, —NR$^0$—CO—NR$^{00}$—, —CY$^1$═CY$^2$— or —C≡C— in such a manner that O and/or S atoms are not linked directly to one another, wherein Y$^1$ and Y$^2$ are independently of each other H, F, Cl or CN, and R$^0$ and R$^{00}$ are independently of each other H or an optionally substituted aliphatic or aromatic hydrocarbon with 1 to 20 C atoms.

Very preferably R$^{3,4}$ are selected from C$_1$-C$_{20}$-alkyl, C$_1$-C$_{20}$-oxaalkyl, C$_2$-C$_{20}$-alkenyl, C$_2$-C$_{20}$-alkynyl, and C$_1$-C$_{20}$-fluoroalkyl.

An alkyl or alkoxy radical, i.e. where the terminal CH$_2$ group is replaced by —O—, can be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, nonoxy, decoxy, undecoxy, dodecoxy, tridecoxy or tetradecoxy, for example.

Oxaalkyl, i.e. where one CH$_2$ group is replaced by —O—, is preferably straight-chain 2-oxapropyl(=methoxymethyl), 2-(=ethoxymethyl) or 3-oxabutyl(=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-,7-, 8- or 9-oxadecyl, for example.

An alkyl group wherein one or more CH$_2$ groups are replaced by —CH═CH— can be straight-chain or branched. It is preferably straight-chain, has 2 to 10 C atoms and accordingly is preferably vinyl, prop-1-, or prop-2-enyl, but-1-, 2- or but-3-enyl, pent-1-, 2-, 3- or pent-4-enyl, hex-1-, 2-, 3-, 4- or hex-5-enyl, hept-1-, 2-, 3-, 4-, 5- or hept-6-enyl, oct-1-, 2-, 3-, 4-, 5-, 6- or oct-7-enyl, non-1-, 2-, 3-, 4-, 5-, 6-, 7- or non-8-enyl, dec-1-, 2-, 3-, 4-, 5-, 6-, 7-, 8- or dec-9-enyl.

Especially preferred alkenyl groups are C$_2$-C$_7$-1E-alkenyl, C$_4$-C$_7$-3E-alkenyl, C$_5$-C$_7$-4-alkenyl, C$_6$-C$_7$-5-alkenyl and C$_7$-6-alkenyl, in particular C$_2$-C$_7$-1E-alkenyl, C$_4$-C$_7$-3E-alkenyl and C$_5$-C$_7$-4-alkenyl. Examples for particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 C atoms are generally preferred.

In an alkyl group wherein one CH$_2$ group is replaced by —O— and one by —CO—, these radicals are preferably neighboured. Accordingly these radicals together form a carbonyloxy group —CO—O— or an oxycarbonyl group —O—CO—. Preferably this group is straight-chain and has 2 to 6 C atoms. It is accordingly preferably acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxyethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl, 4-(methoxycarbonyl)-butyl.

An alkyl group wherein two or more CH$_2$ groups are replaced by —O— and/or —COO— can be straight-chain or branched. It is preferably straight-chain and has 3 to 12 C atoms. Accordingly it is preferably bis-carboxy-methyl, 2,2-bis-carboxy-ethyl, 3,3-bis-carboxy-propyl, 4,4-bis-carboxy-butyl, 5,5-bis-carboxy-pentyl, 6,6-bis-carboxy-hexyl, 7,7-bis-carboxy-heptyl, 8,8-bis-carboxy-octyl, 9,9-bis-carboxy-nonyl, 10,10-bis-carboxy-decyl, bis-(methoxycarbonyl)-methyl, 2,2-bis-(methoxycarbonyl)-ethyl, 3,3-bis-(methoxycarbonyl)-propyl, 4,4-bis-(methoxycarbonyl)-butyl, 5,5-bis-(methoxycarbonyl)-pentyl, 6,6-bis-(methoxycarbonyl)-hexyl, 7,7-bis-(methoxycarbonyl)-heptyl, 8,8-bis-(methoxycarbonyl)-octyl, bis-(ethoxycarbonyl)-methyl, 2,2-bis-(ethoxycarbonyl)-ethyl, 3,3-bis-(ethoxycarbonyl)-propyl, 4,4-bis-(ethoxycarbonyl)-butyl, 5,5-bis-(ethoxycarbonyl)-hexyl.

An alkyl or alkenyl group that is monosubstituted by CN or CF$_3$ is preferably straight-chain. The substitution by CN or CF$_3$ can be in any desired position.

An alkyl or alkenyl group that is at least monosubstituted by halogen is preferably straight-chain. Halogen is preferably F or Cl, in case of multiple substitution preferably F. The resulting groups include also perfluorinated groups. In case of monosubstitution the F or Cl substituent can be in any desired position, but is preferably in co-position. Examples for especially preferred straight-chain groups with a terminal F substituent are fluoromethyl, 2-fluoroethyl, 3-fluoropropyl, 4-fluorobutyl, 5-fluoropentyl, 6-fluorohexyl and 7-fluoroheptyl. Other positions of F are, however, not excluded.

R$^{3,4}$ can be an achiral or a chiral group. Particularly preferred chiral groups are 2-butyl (=1-methylpropyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methyl heptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy for example. Very preferred are 2-hexyl, 2-octyl, 2-octyloxy, 1,1,1-trifluoro-2-hexyl, 1,1,1-trifluoro-2-octyl and 1,1,1-trifluoro-2-octyloxy.

Preferred achiral branched groups are isopropyl, isobutyl (=methylpropyl), isopentyl (=3-methylbutyl), isopropoxy, 2-methyl-propoxy and 3-methylbutoxy.

In the groups defined above and below, $R^0$ and $R^{00}$ are preferably selected from H, straight-chain or branched alkyl with 1 to 12 C atoms. Halogen is F, Cl, Br or I, preferably F or Cl. The group —$CY^1$=$CY^2$— is preferably —CH=CH—, —CF=CF— or —CH=C(CN)—. The group —$CR^0R^{00}$— is preferably —$C(CH_3)_2$—.

In the polymers of formula I, the total number of repeating units n is preferably ≥3, very preferably ≥10, most preferably ≥20, and preferably ≤500, very preferably ≤1,000, most preferably ≤2,000.

Further preferred are polymers of formula I wherein k in all repeating units (i.e. all occurring indices k) denote 1.

Further preferred are polymers of formula I wherein m in all repeating units (i.e. all occurring indices m) denote 1.

The polymers of formula I include homopolymers and copolymers, like statistical or random copolymers, alternating copolymers and block copolymers, as well as combinations thereof.

The polymers of formula I and the monomers used for preparing them can be synthesized according to or in analogy to methods which are known per se and which are described in the literature and in standard works of organic chemistry such as, for example, Houben-Weyl, Methoden der organischen Chemie, Thieme-Verlag, Stuttgart. Especially suitable methods for preparing the monomer are disclosed or can be derived from U.S. Pat. No. 6,203,724. Further suitable methods of synthesis are also described below and in the examples.

For example, homo- or copolymers of formula I can be prepared by reacting one or more monomers of formula IM

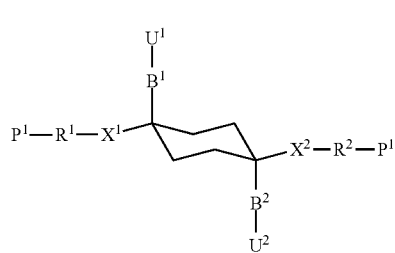

IM with each other or with one or more monomers of formula IIIM

IIIM wherein $R^{1,2}$, $X^{1,2}$, $B^{1,2}$, U1,2 have the meanings given in formula I, $X^{5,6}$, $A^{1,2}$, $Z^1$ and p have the meanings given in formula III, and $P^1$ and $P^2$ denote independently of each other a reactive functional group.

$P^1$ and $P^2$ denote preferably functional groups that are capable of a condensation polymerization or addition polymerization reaction with each other or with other functional groups.

Suitable and preferred polymerizable functional groups $P^{1,2}$, include, for example HO—, $HW^1N$—, HO—$CW^1W^2$—NH—, HOOC—or OCN—, with $W^1$ and $W^2$ being independently of each other H or alkyl with 1 to 5 C-atoms, in particular H, methyl, ethyl or n-propyl.

Depending on the type of polymerizable group and the polymer preparation and workup method, the asterisk (*) in formula I and its subformulae can denote a corresponding terminal group like e.g. H or OH or another group.

The monomers of formula IM and IIIM are another aspect of the invention.

For example, cyclohexane monomers like diols can be condensed with a suitable dicarboxylic acid to give a copolyester as exemplarily illustrated in Scheme 1 below.

Scheme 1

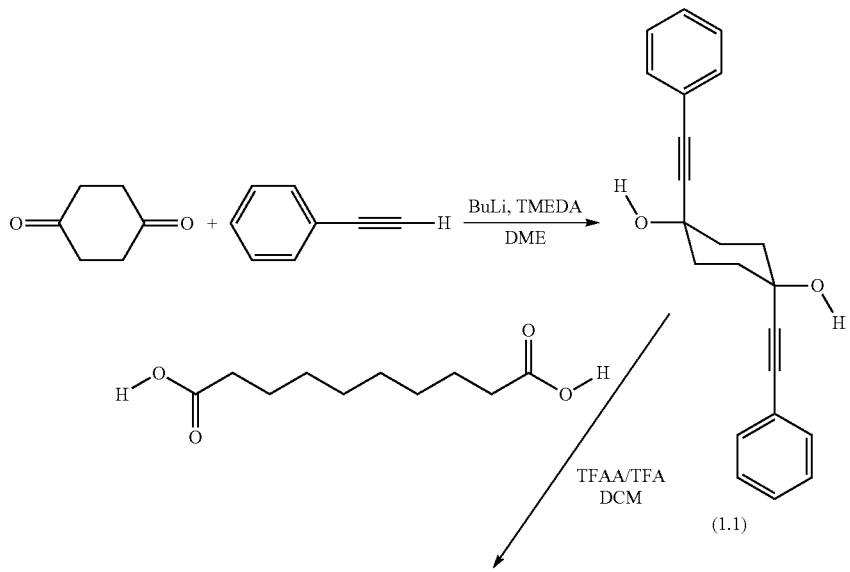

(1.1)

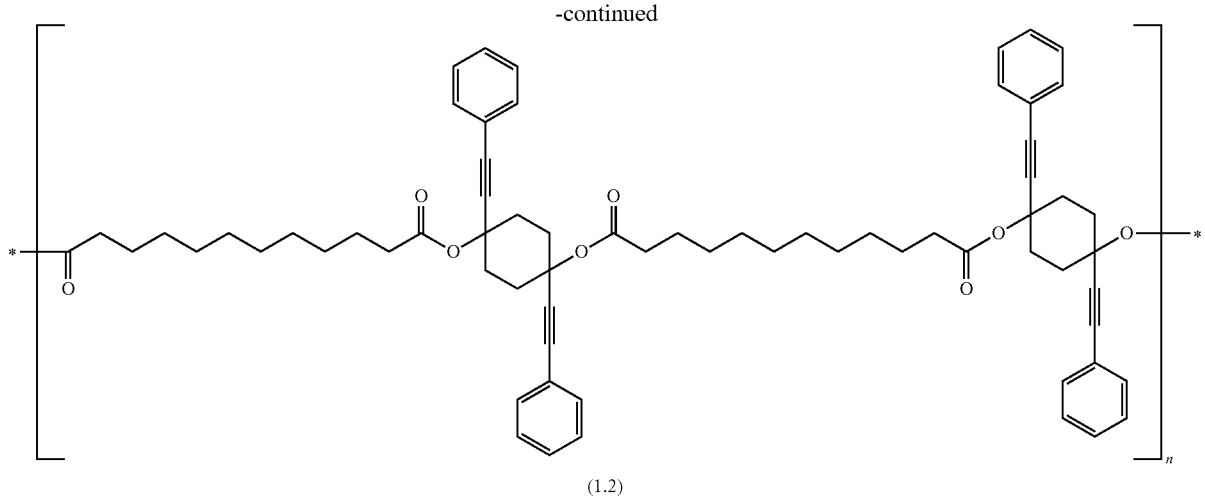

(1.2)

Copolymer (1.2) is prepared by reacting 1,4-cyclohexandione with (2-phenylethynyl)lithium to give a mixture of the cis and trans isomers of the diol, isolating the trans isomer by recrystallisation, and esterification of the diol (1.1) with dodecanedioic acid to give the polymer (1.2).

The cyclohexane diols can also be reacted with another suitable diol in the presence of eg phosgene to give a copolycarbonate, as disclosed for example by A. Uchiyama and T. Yatabe in J. Polym. Sci. Part B; Polym Phys Vol 41, 1554, (2003). The preparation of polymers from 1,4-cyclohexanediols is described fore example U.S. Pat. No. 4,985,536. Furthermore, the preparation of polycarbonates containing 1,4-cyclohexanediol units is described for example in GB 2 355 267 A.

The methods of preparing a polymer of formula I, its precursors, and birefringent polymer films comprising it, as described above and below, the novel intermediates used therein and obtained thereby, and their use for preparing a polymer of formula I or its precursors, are further aspects of the invention.

The polymer of formula I preferably has positive birefringence and negative (or "reverse") dispersion.

The polymers and polymer films according to the present invention may also be crosslinked, for example when using a monomeric unit of formula IM or IIIM comprising a further reactive group. Preferred monomeric units of formula IM or IIIM of this type are those wherein at least one of the groups $B^{1,2}$ or $A^{1,2}$ respectively, are substituted by at least one polymerizable group P, which is capable of participating in a polymerization reaction, like radical or ionic chain polymerization, polyaddition or polycondensation, or capable of being grafted, for example by condensation or addition, to a polymer backbone in a polymer analogous reaction. Especially preferred are polymerizable groups P for chain polymerization reactions, like radical, cationic or anionic polymerization. Very preferred are polymerizable groups comprising a C—C double or triple bond, like acrylate, methacrylate, fluoroacrylate, chloroacrylate, cyanoacrylate, styrene, styryloxy or vinyloxy groups, and polymerizable groups capable of polymerization by a ring-opening reaction, like oxetane or epoxy groups.

Polymers of formula I and polymer films can be prepared by known methods, for example polycondensation in solution with a mixture of dialcohols and diacids, e.g. selected of formula IM and IIIM, wherein one of $P^1$ and $P^2$ is OH and the other is COOH, to give a polyester, or by interfacial polycondensation of dialcohols e.g. selected of formula IM wherein $P^1$ is OH, and phosgene gas to give a polycarbonate.

The thickness of a polymer film according to the present invention is preferably from 0.3 to 5 microns, very preferably from 0.5 to 3 microns, most preferably from 0.7 to 1.5 microns. For use as alignment layer, thin films with a thickness of 0.05 to 1, preferably 0.1 to 0.4 microns are preferred.

The polymer films and materials of the present invention can be used as retardation or compensation film for example in LCDs to improve the contrast and brightness at large viewing angles and reduce the chromaticity. It can be used outside the switchable LC cell of the LCD or between the substrates, usually glass substrates, forming the switchable LC cell and containing the switchable LC medium (in cell application).

The polymer film and materials of the present invention can be used in conventional LC displays, for example displays with vertical alignment like the DAP (deformation of aligned phases), ECB (electrically controlled birefringence), CSH (colour super homeotropic), VA (vertically aligned), VAN or VAC (vertically aligned nematic or cholesteric), MVA (multi-domain vertically aligned), PVA (patterned vertically aligned) or PSVA (polymer stabilised vertically aligned) mode; displays with bend or hybrid alignment like the OCB (optically compensated bend cell or optically compensated birefringence), R-OCB (reflective OCB), HAN (hybrid aligned nematic) or pi-cell (π-cell) mode; displays with twisted alignment like the TN (twisted nematic), HTN (highly twisted nematic), STN (super twisted nematic), AMD-TN (active matrix driven TN) mode; displays of the IPS (in plane switching) mode, or displays with switching in an optically isotropic phase.

The layers, films and materials of the present invention can be used for various types of optical films, preferably selected from optically uniaxial films (A-plate, C-plate, negative C-plate, O-plate), twisted optical retarders, like for example twisted quarter wave foils (QWF), achromatic retarders, achromatic QWFs or half wave foils (HWF), and optically biaxial films. The LC phase structure in the layers and materials can be selected from cholesteric, smectic, nematic and blue phases. The alignment of the LC material in the layer can be selected from homeotropic, splayed, tilted, planar and blue-phase alignment. The layers can be uniformly oriented or exhibit a pattern of different orientations.

The films can be used as optical compensation film for viewing angle enhancement of LCD's or as a component in a brightness enhancement films, furthermore as an achromatic element in reflective or transflective LCD's. Further preferred applications and devices include

- retarding components in optoelectronic devices requiring similar phase shift at multiple wavelengths, such as combined CD/DVD/HD-DVD/Blu-Ray, including reading, writing re-writing data storage systems
- achromatic retarders for optical devices such as cameras
- achromatic retarders for displays including OLED and LCD's.

The following examples are intended to explain the invention without restricting it. The methods, structures and properties described hereinafter can also be applied or transferred to materials that are claimed in this invention but not explicitly described in the foregoing specification or in the examples.

Above and below, percentages are percent by weight. All temperatures are given in degrees Celsius. m.p. denotes melting point, cl.p. denotes clearing point, $T_g$ denotes glass transition temperature. Furthermore, C=crystalline state, N=nematic phase, S=smectic phase and I=isotropic phase. The data between these symbols represent the transition temperatures. Δn denotes the optical anisotropy ($\Delta n=n_e-n_o$, where $n_o$ denotes the refractive index parallel to the longitudinal molecular axes and $n_e$ denotes the refractive index perpendicluar thereto), measured at 589 nm and 20° C. The optical and electrooptical data are measured at 20° C., unless expressly stated otherwise.

In the description and claims of this specification, unless stated otherwise the retardation and dispersion are determined by the methods as described above.

Unless stated otherwise, the percentages of components of a polymerizable mixture as given above and below refer to the total amount of solids in the mixture polymerizable mixture, i.e. not including solvents.

EXAMPLE 1

Copolymer (1) was prepared as shown in Scheme 1 above.

Synthesis of trans-1,4-bis-phenylethynyl-cyclohexane-1,4-diol (1.1)

Phenyl acetylene (4.18 ml, 37.32 mmol) was dissolved in 160 ml DME. The solution was cooled on a dry ice bath to −78° C. A solution of 1.6 M butyl lithium in cyclohexane (28.18 ml, 45.09 mmol) and TMEDA (5.42 ml, 37.32 mmol) was added slowly. The solution was stirred for 60 minutes. The 1,4-cyclohexanedione (2.00 g, 17.84 mmol) was dissolved in 80 ml of DME and added drop-wise over approximately 50 minutes. The solution was stirred for 30 minutes and then allowed to warm to room temperature before being poured onto a solution of ammonium chloride and ice. Hydrochloric acid was added to acidify the solution to pH 0. It was then covered in foil and left in the fume hood for five days. The solution was extracted with DCM, washed with water and brine, dried over sodium sulphate and concentrated to yield the product as a pale brown oil that crystallised on standing.

The product was recrystallised from DCM/petrol. The product (0.62 g) was isolated as a white solid by hot filtration. 100% pure by GCMS. 1H NMR (7388.2) showed expected signals for aromatic and —OH groups, aliphatics were obscured by solvents (DMSO/THF), 1 spot by TLC (possibly very faint spot on baseline), small impurity by HPLC.

The structure of the final compound was verified by X-ray crystallography which showed that the final product was the trans isomer.

Synthesis of (1)

Trifluoroacetic anhydride (0.52 ml, 3.73 mmol) was added to a solution of dodecanedioic acid (0.43 g, 1.86 mmol) in 5 ml of DCM. The solution was stirred under nitrogen for 30 mins. trans-1,4-Bis-phenylethynyl-cyclohexane-1,4-diol (1.1) (0.59 g, 1.86 mmol) was added to a 50 ml 3-neck flask and partially dissolved in 2.5 ml DCM. The pre-made mixed anhydride was added to the alcohol and the reaction stirred overnight at room temperature. Water was subsequently added and the reaction stirred for ~2 hrs. The layers were separated and organics washed with water, sodium hydrogen carbonate solution, water and brine, dried over sodium sulphate and concentrated to yield the product as a dark brown oil (0.64 g).

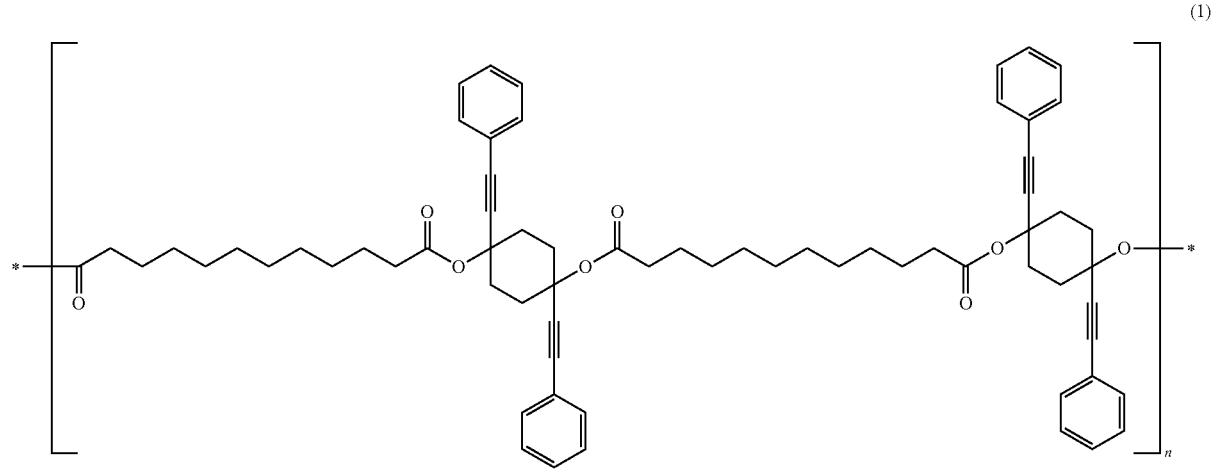

(1)

The oil was dissolved in acetone and a small amount of petrol and left in the freezer for a week, but no solid formed. The solution was stirred on ice and a solution of methanol (~250 ml) and HCl (~4 ml) was added. The solution went cloudy and was left in the freezer overnight. A solid formed, but was too fine to be filtered. The solution was concentrated under vacuum to remove most of the DCM and petrol. A solid with a larger particle size formed and this was collected, along with a second crop from the filtrate. GPC showed a polymer mass of 1305, indicating a chain length of five units.

The invention claimed is:

1. Compounds of formula I

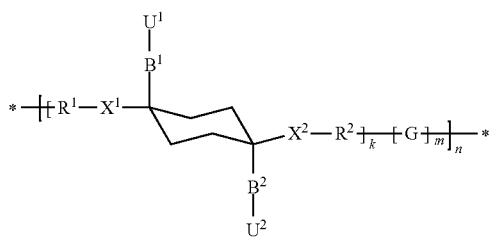

wherein k is, in each occurrence independently of one another, 0 or 1, with k in at least one repeating unit being 1, m is, in each occurrence independently of one another, 0 or 1, n is an integer >1, $R^1$, $R^2$ are independently of each other straight-chain, branched or cyclic alkylene with 1 to 20, which is unsubstituted, mono- or polysubstituted by F, Cl, Br, I or CN, and wherein one or more non-adjacent $CH_2$ groups are optionally replaced, in each case independently from one another, by —O—, —S—, —NH—, —$NR^0$—, —$SiR^0R^{00}$—, —CO—, —CO—O—, —O—CO—, —O—CO—O—, —S—CO—, —CO—S—, —$SO_2$—, —CO—$NR^0$—, —$NR^0$—CO—, —$NR^0$—CO—$NR^{00}$—, —$CY^1$=$CY^2$— or —C≡C— in such a manner that O and/or S atoms are not linked directly to one another, or a single bond, $Y^1$, $Y^2$ are independently of each other H, F, Cl, CN or $R^0$, $R^0$, $R^{00}$ are independently of each other H or alkyl with 1 to 12 C-atoms, $X^1$, $X^2$ are independently of each other a linkage group selected from the group consisting of —O—, —S—, —CO—, —CO—O—, —O—CO—, —O—CO—O—, —CO—$NR^0$—, —$NR^0$—CO—, —$NR^0$—CO—$NR^0$—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$(CH_2)_{n1}$—, —$(CF_2)_{n1}$—, —$CF_2CH_2$—, —$CH_2CF_2$—, —$CF_2CF_2$—, —CH=CH—, —$CY^1$=$CY^2$—, —CH=N—, —N=CH—, —N=N—, —CH=$CR^0$—, —C≡C—, —CH=CH—CO—O—, —O—CO—CH=CH—, —$CR^0R^{00}$— and a single bond, n1 is 1, 2, 3, 4, 5 or 6, $B^1$, $B^2$ are independently of each other a bivalent group having high polarisability selected from the group consisting of —C≡C—, —$CY^1$=$CY^2$—, optionally substituted aromatic or heteroaromatic groups, and combinations of the aforementioned, $U^1$, $U^2$ are independently of each other H or a monovalent group of formula II, wherein the asterisk denotes the linkage to the adjacent group $B^1$ or $B^2$, respectively

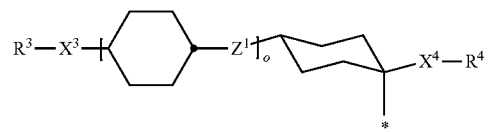

$R^3$, $R^4$ are independently of each other straight-chain, branched or cyclic alkyl with 1 to 20, which is unsubstituted, mono- or polysubstituted by F, Cl, Br, I or CN, and wherein one or more non-adjacent $CH_2$ groups are optionally replaced, in each case independently from one another, by —O—, —S—, —NH—, —$NR^0$—, —$SiR^0R^{00}$—, —CO—, —CO—O—, —O—CO—, —O—CO—O—, —S—CO—, —CO—S—, —$SO_2$—, —CO—$NR^0$—, —$NR^0$—CO—, —$NR^0$—CO—$NR^{00}$—, —$CY^1$=$CY^2$— or —C≡C— in such a manner that O and/or S atoms are not linked directly to one another, or a single bond, $X^3$, $X^4$ independently of each other have one of the meanings of $X^1$, $Z^1$ has in each occurrence independently of one another one of the meanings of $X^1$, o is 0, 1, 2, 3, 4 or 5, G has one of the meanings of $R^1$ or is a bivalent group of formula III $$—X^5-A^1-(Z^2-A^2)_p-X^6—\qquad III$$

$X^5$, $X^6$ independently of each other have one of the meanings of $X^1$, $A^1$, $A^2$ are independently of each other a carbocyclic, heterocyclic, aromatic or heteroaromatic group, which is optionally substituted, $Z^2$ has in each occurrence independently of one another one of the meanings of $X^1$, and p is 0, 1, 2 or 3.

2. Compounds according to claim 1, characterized in that $B^1$ and $B^2$ are selected from the group consisting of —C≡C—, —C≡C—C≡C—, —C≡C—C≡C—C≡C—, —C≡C—C≡C—C≡C—C≡C—,

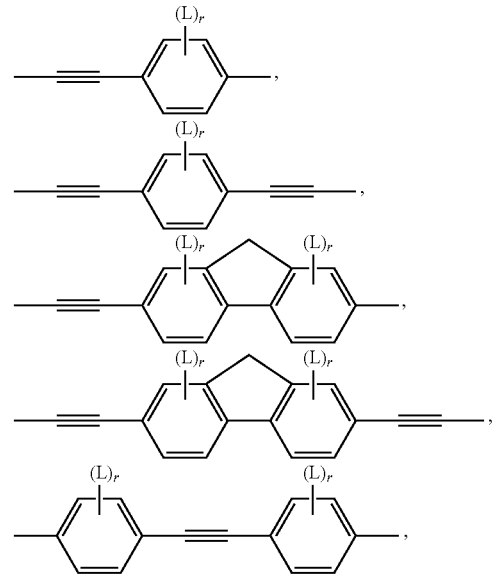

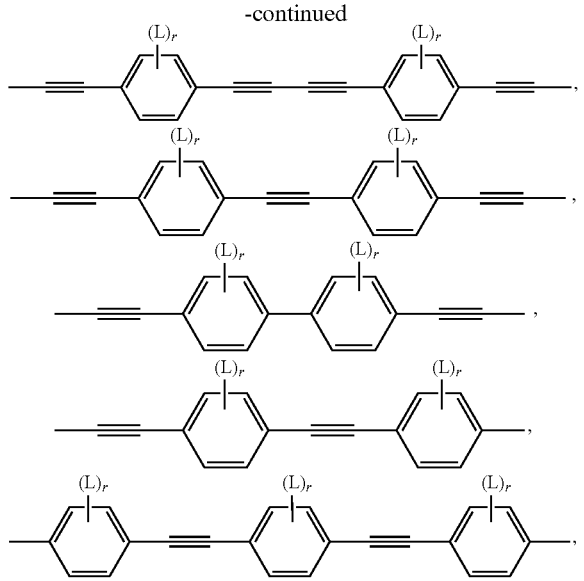

wherein r is 0, 1, 2, 3 or 4 and L is selected from F, Cl, Br, I, —CN, —NO$_2$, —NCO, —NCS, —OCN, —SCN, —C(=O)NR$^0$R$^{00}$, —C(=O)X, —C(=O)OR$^0$, —C(=O)R$^0$, —NR$^0$R$^{00}$, —OH, —SF$_5$, optionally substituted silyl, aryl with 1 to 12 C atoms, and straight chain or branched alkyl, alkoxy, alkylcarbonyl, alkoxycarbonyl, alkylcarbonyloxy or alkoxycarbonyloxy with 1 to 12 C atoms, wherein one or more H atoms are optionally replaced by F or Cl, wherein R$^0$ and R$^{00}$ are as defined in claim 1 and X is halogen.

3. Compounds according to claim 1, characterized in that R$^1$ and R$^2$ are a single bond.

4. Compounds according to claim 1, characterized in that U$^1$ and U$^2$ are H.

5. Compounds according to claim 1, characterized in that X$^{1-6}$ are selected from —O—, —CO—, —CO—O—, —O—CO— and —O—CO—O—.

6. Compounds according to claim 2, characterized in that A$^1$ and A$^2$ are selected from 1,4-phenylene, wherein optionally 1, 2 or 3 CH groups are replaced by N, or cyclohexylene-1,4-diyl, wherein optionally 1 or 2 non-adjacent CH$_2$ groups are replaced by O and/or S, wherein all these rings are unsubstituted or substituted by 1, 2, 3 or 4 groups L as defined in claim 2.

7. Compounds according to claim 1, characterized in that the bivalent group G is selected from the group consisting of the following subformulae:

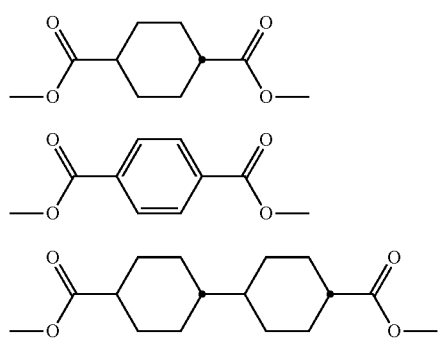

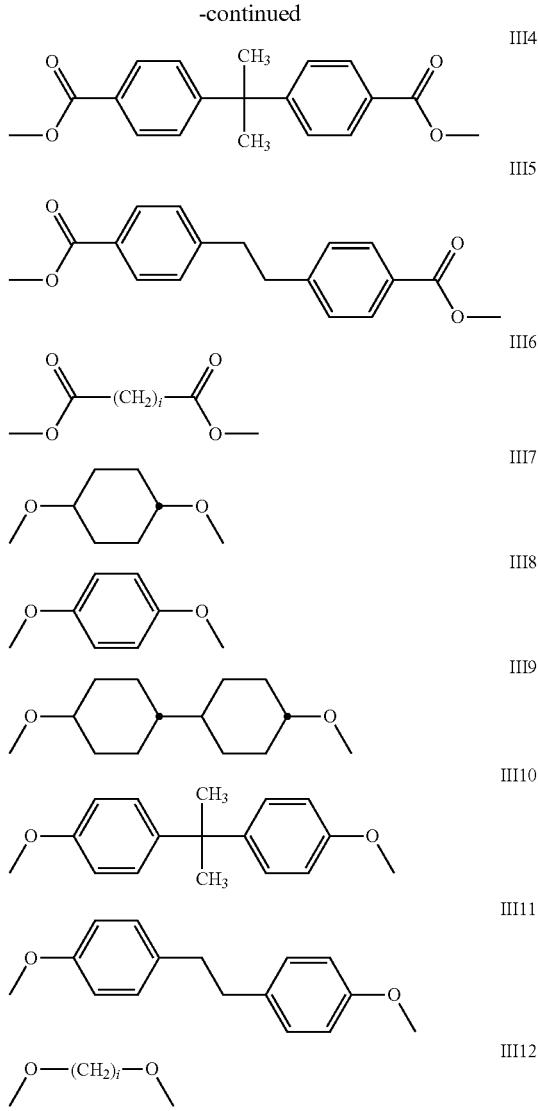

wherein i is an integer from 1 to 12.

8. Birefringent polymer film comprising a compound according to claim 1.

9. A method comprising incorporating compounds and polymer films according to claim 1 in optical, electronic and electrooptical components and devices.

10. Optical, electronic or electrooptical component or device, comprising a compound or polymer film according to claim 1.

11. A device or component according to claim 10, characterized in that is selected from electrooptical displays, LCDs, optical films, polarizers, compensators, beam splitters, reflective films, alignment layers, color filters, holographic elements, hot stamping foils, colored images, decorative or security markings, LC pigments, adhesives, non-linear optic (NLO) devices, optical information storage devices, electronic devices, organic semiconductors, organic field effect transistors (OFET), integrated circuits (IC), thin film transistors (TFT), Radio Frequency Identification (RFID) tags, organic light emitting diodes (OLED), organic light emitting transistors (OLET), electroluminescent displays, organic photovoltaic (OPV) devices, organic solar cells (O-SC), organic laser diodes (O-laser), organic integrated circuits (O-IC), lighting devices, sensor devices, electrode materials, photoconductors, photodetectors, electrophotographic recording devices, capacitors, charge injection layers, Schottky diodes, planarising layers, antistatic films, conducting substrates, conducting patterns, photoconductors, electrophotographic applications, electrophotographic recording, organic memory devices, biosensors, biochips, optoelectronic devices requiring similar phase shift at multiple wavelengths, combined CD/DVD/HD-DVD/Blu-Rays, reading, writing re-writing data storage systems, or cameras.

12. Optical component according to claim 10, characterized in that it is an optically uniaxial film selected from an A-plate, C-plate, negative C-plate or O-plate, a twisted optical retarder, a twisted quarter wave foil (QWF), an optically biaxial film, an achromatic retarder, an achromatic QWF or half wave foil (HWF), a film having a cholesteric, smectic, nematic or blue phase, a film having homeotropic, splayed, tilted, planar or blue-phase alignment, which is uniformly oriented or exhibits a pattern of different orientations.

13. Process of preparing a compound according to claim 1 by reacting one or more monomers of formula IM

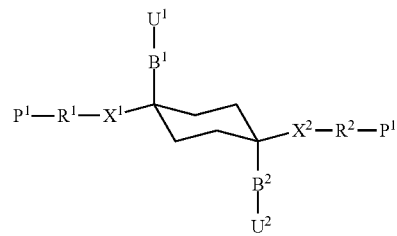

IM with each other or with one or more monomers of formula IIIM $$P^2-X^5-A^1-(Z^2-A^2)_p-X^6-P^2 \quad \text{IIIM}$$

wherein $R^{1,2}$, $X^{1,2}$, $B^{1,2}$, $U^{1,2}$, $A^{1,2}$, $Z^1$, p and $X^{5,6}$ have the meanings given in claim 1, and $P^1$ and $P^2$ denote independently of each other a reactive functional group.

* * * * *